S. E. TOTTEN. Jr.

Sash-Holders for Carriage Windows.

No. 5,426. Reissued May 27, 1873.

Witnesses.
Chas. Wahlers
Ernst Billmeier

Inventor.
Silas E. Totten Jr.
Per Dodwell & Hauff
Attys

UNITED STATES PATENT OFFICE.

SILAS E. TOTTEN, JR., OF NEW YORK, N. Y., ASSIGNOR TO WINFIELD BLOODGOOD.

IMPROVEMENT IN SASH-HOLDERS FOR CARRIAGE-WINDOWS.

Specification forming part of Letters Patent No. 136,793, dated March 11, 1873; reissue No. 5,426, dated May 27, 1873; application filed April 25, 1873.

*To all whom it may concern:*

Be it known that I, SILAS E. TOTTEN, JR., of the city and county and State of New York, have invented a new and useful Improvement in Sash-Holders for Carriage-Windows; and I do hereby declare the following to be a full, clear, and exact description thereof, which will enable those skilled in the art to make and use the same, reference being had to the accompanying drawing forming part of this specification, in which drawing—

Figure 1:
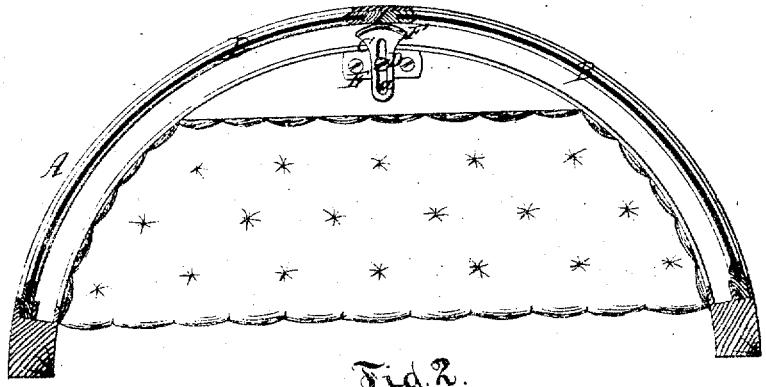
Figure 2:
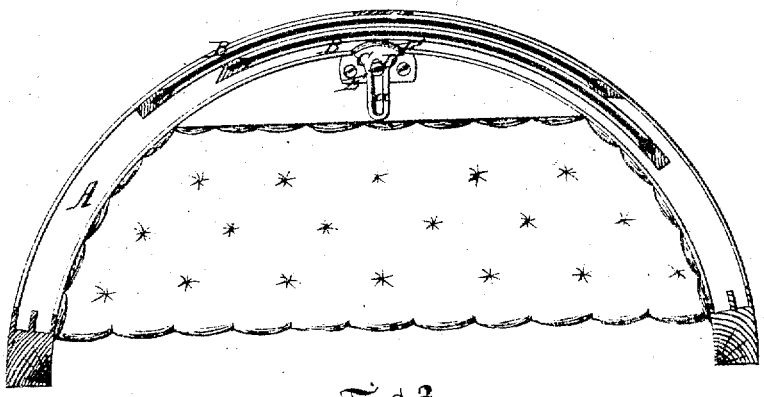
Figure 3:
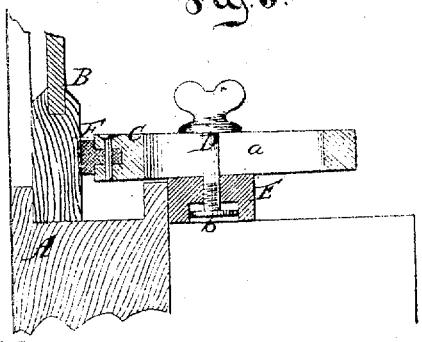

Figure 1 represents a plan view of my device when applied to the closed sashes of a carriage. Fig 2 is a similar view of the same when the sashes are opened. Fig. 3 is a longitudinal vertical section of this invention.

Similar letters indicate corresponding parts.

This invention relates particularly to that class of fastenings which are intended for securing and holding the window-sashes in glass-front carriages; and the object of my invention is to provide a device which can be adjusted to a sash of any desired form or size, and which, when one sash is pushed within the other, can be made to abut against the inner sash, so as to retain both sashes firmly in position and prevent them from rattling.

My invention consists in a stop, which slides on a bracket secured to the sill or slide of a window-frame, and provided with a set-screw or clamping-screw in such a manner that the point or bearing-surface of the stop can be adjusted to different thicknesses of sashes, and that it can be brought to bear on the sashes, in a glass-front carriage for instance, when said sashes are closed and also when they are opened or partly opened, one being pushed behind the other. In the bearing-surface of my stop is secured an elastic pad to prevent the stop from injuring the surface of the sashes.

In the example shown by the drawing, the letter A designates the front segmental sill of a glass-front carriage in which slide the segmental sashes B B. When the sashes B B are to be opened it is necessary to slide one within the other in the frame, (see Fig. 2,) and when a permanent pivoted stop is used the additional bulk given to the sash will not allow the stop to be brought at right angles to the same and the stop becomes useless. My stop or fastener is provided with a slot, *a*, that works on a thumb or set screw, D, which rises from a bracket, E, that is secured to the sill of the window-frame. The screw on its lower end is provided with a disk or washer, *b*, (see Fig. 3,) to prevent it from screwing out of its socket in the bracket. One end of my stop is curved or segmental, and it is provided with a pad, F, of India rubber or other elastic material, which bears against the surface of the sash B, and not only prevents injury to the varnished or polished surface of the sash, but also exerts an elastic pressure, and the shaking or rattling of the sash or sashes is effectually prevented. When the position of my stop is to be altered, the screw D is loosened, and the stop is moved forward or backward on the bracket E, until its bearing-surface corresponds to the change in the sashes, and by tightening the screw the stop is fastened in the required position.

My fastener may be applied to sashes or windows in buildings, railroad-cars, or steamboats as well as to sashes of carriages.

What I claim as new, and desire to secure by Letters Patent, is—

A sliding stop, C, moving on a bracket, E, in combination with a set-screw, D, with or without an elastic pad, F, substantially as described, for the object specified.

SILAS E. TOTTEN, JR.

Witnesses:
W. HAUFF,
E. F. KASTENHUBER.